US008660572B2

(12) United States Patent
Zhu et al.

(10) Patent No.: US 8,660,572 B2
(45) Date of Patent: Feb. 25, 2014

(54) METHOD AND APPARATUS FOR CENTRALLY MANAGED ALLOCATION OF BANDWIDTH IN A WIRELESS NETWORK

(75) Inventors: Chenxi Zhu, Fairfax, VA (US); Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/511,476

(22) PCT Filed: Jan. 12, 2011

(86) PCT No.: PCT/US2011/020911
§ 371 (c)(1),
(2), (4) Date: May 23, 2012

(87) PCT Pub. No.: WO2011/129901
PCT Pub. Date: Oct. 20, 2011

(65) Prior Publication Data
US 2013/0023277 A1    Jan. 24, 2013

Related U.S. Application Data

(63) Continuation of application No. 12/968,554, filed on Dec. 15, 2010, now abandoned.

(60) Provisional application No. 61/323,209, filed on Apr. 12, 2010.

(51) Int. Cl.
*H04W 72/00* (2009.01)

(52) U.S. Cl.
USPC ..................................... 455/452.2

(58) Field of Classification Search
USPC ........... 455/509, 452.2, 522, 450, 452.1, 436, 455/42, 67.13, 501, 552.1; 370/328, 336, 370/230, 252, 388, 468, 338; 375/225, 259
See application file for complete search history.

(56) References Cited

U.S. PATENT DOCUMENTS

| 8,385,197 | B2 * | 2/2013 | Krym et al. | 370/230 |
| 2004/0192324 | A1 * | 9/2004 | Rudkin | 455/452.2 |
| 2006/0223561 | A1 * | 10/2006 | Capece et al. | 455/509 |
| 2008/0167064 | A1 * | 7/2008 | Bar-Ness et al. | 455/522 |
| 2009/0042593 | A1 | 2/2009 | Yavuz et al. | 455/522 |

FOREIGN PATENT DOCUMENTS

EP    1 241 903 A2    9/2002    ............... H04Q 7/24

* cited by examiner

*Primary Examiner* — Kiet Doan
(74) *Attorney, Agent, or Firm* — Baker Botts L.L.P.

(57) ABSTRACT

A method for allocating bandwidth in a wireless network includes communicating wirelessly with at least one endpoint using a first frequency bandwidth. The method may also include receiving a measurement of a signal quality from the at least one endpoint and communicating an indication of the signal quality to a server. The method may further include receiving from the server a second frequency bandwidth based on the signal quality and a cost per unit of frequency bandwidth. The second frequency bandwidth may indicate an amount of frequency bandwidth to use in communicating wirelessly with the at least one endpoint. The method may additionally include communicating wirelessly with the at least one endpoint using the second frequency bandwidth.

15 Claims, 2 Drawing Sheets

METHOD AND APPARATUS FOR CENTRALLY MANAGED ALLOCATION OF BANDWIDTH IN A WIRELESS NETWORK

CROSS REFERENCE TO RELATED APPLICATIONS

This application is a U.S. National Stage Application of International Application No. PCT/US2011/020911 filed Jan. 12, 2011, which designates the United States, which is a continuation of U.S. patent application Ser. No. 12/968,554, filed Dec. 15, 2010, which claims priority under 35 U.S.C. §119(e) to U.S. Provisional Patent Application Ser. No. 61/323,209, filed Apr. 12, 2010, the contents of which are hereby incorporated in their entirety by reference herein.

TECHNICAL FIELD

The present disclosure relates generally to methods and apparatuses for centralized allocation of bandwidth in a wireless network.

BACKGROUND

Various wireless technologies (e.g., 3G, 4G, 3GPP Long Term Evolution (LTE), LTE-Advanced (LTE-A), WiMAX, etc.) allow for the use of small, user installed, base stations, generally referred to as femto base stations (fBSs) (also known as femtocells in WiMAX or Home node-B in 3GPP). An fBS may be provided to a user by a wireless service provider (WSP). The user installs the fBS in their home or office, generally referred to herein as a home or home location, to increase the quality and signal strength of the local wireless coverage. The fBS's backhaul connection to the WSP's network (WSPN) is provided via the user's home network access (e.g., DSL). The fBS operates in a similar wireless fashion (e.g., uses the same licensed frequency band) to the WSP's macro base stations (MBSs). Because, an fBS operates in a similar wireless fashion to an MBS, it may be possible for an endpoint to use the same wireless service to establish a connection through the fBS.

SUMMARY OF THE DISCLOSURE

The teachings of the present disclosure relate to methods and apparatuses for centralized allocation of bandwidth in a wireless network. For example, a method for allocating bandwidth in a wireless network may include communicating wirelessly with at least one endpoint using a first frequency bandwidth. The method may also include receiving a measurement of a signal quality from the at least one endpoint and communicating an indication of the signal quality to a server. The method may further include receiving from the server a second frequency bandwidth based on the signal quality and a cost per unit of frequency bandwidth. The second frequency bandwidth may indicate an amount of frequency bandwidth to use in communicating wirelessly with the at least one endpoint. The method may additionally include communicating wirelessly with the at least one endpoint using the second frequency bandwidth.

Technical advantages of particular embodiments include providing a bandwidth updating algorithm that allows one or more base stations of a network to use a frequency bandwidth that maximizes a net utility of the base stations. Another technical advantage of particular embodiments is that a network of base stations may approach and/or converge to a Nash equilibrium. Another technical advantage of particular embodiments is that a base station may randomly select a plurality of frequency subcarriers to use in communicating with one or more endpoints. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
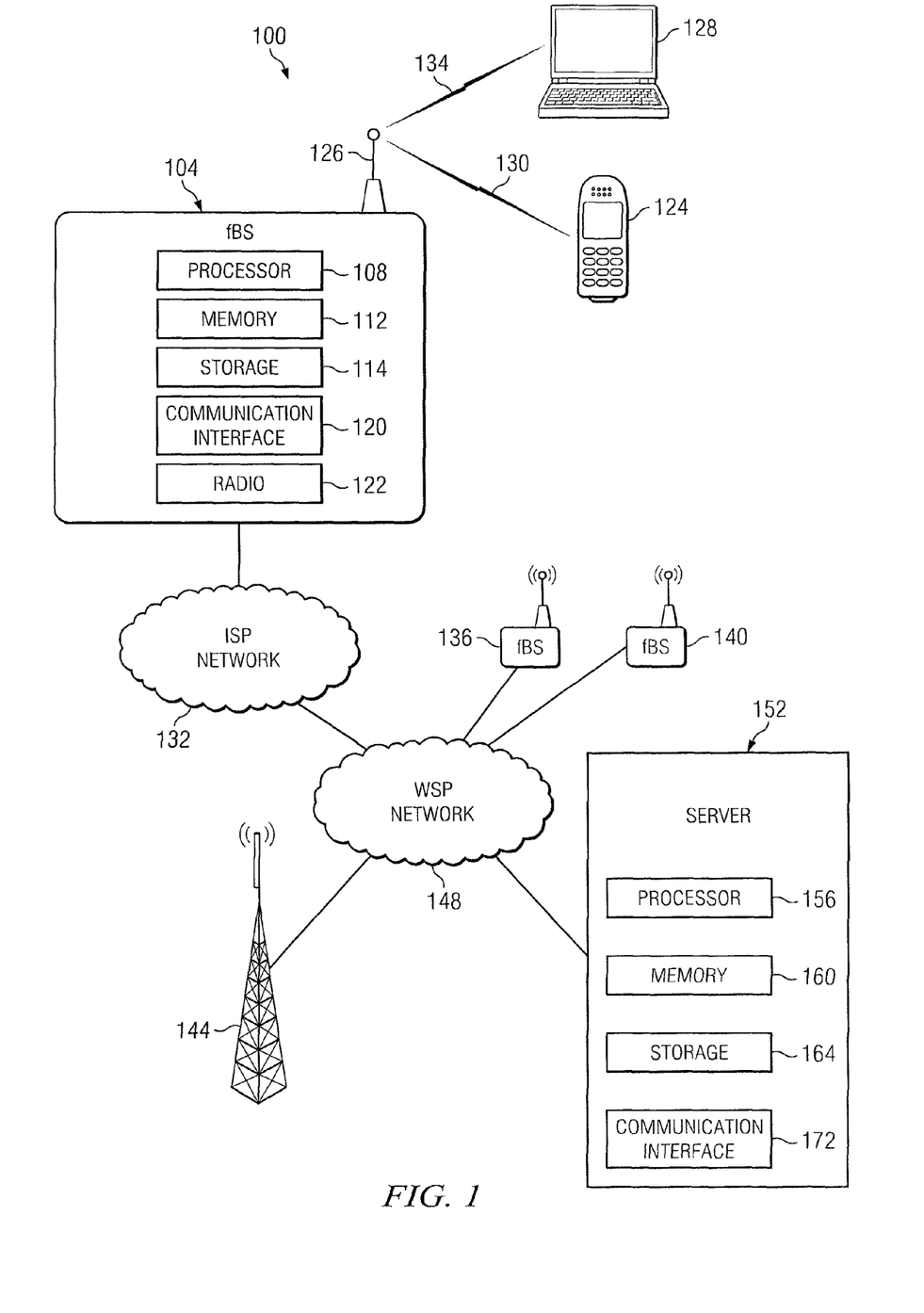
FIG. 1 depicts an example of a system for allocating bandwidth in a wireless network in accordance with particular embodiments.
Figure 2:
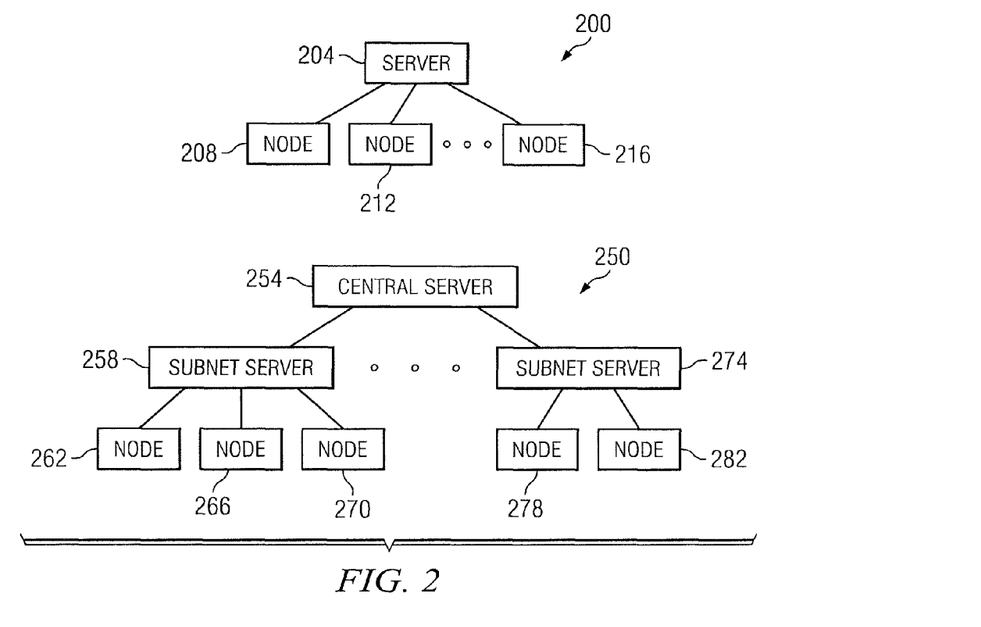
FIG. 2 depicts examples of network topologies for allocating bandwidth in a wireless network in accordance with particular embodiments.
Figure 3:
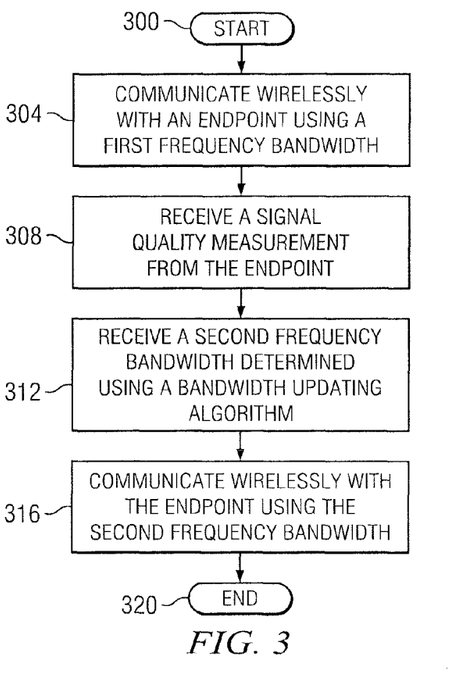
FIG. 3 depicts an example of a method for allocating bandwidth in a wireless network in accordance with particular embodiments.

Embodiments and their advantages are best understood by referring to FIGS. 1-3 of the drawings, like numerals being used for like and corresponding parts of the various drawings.

FIG. 1 depicts an example of a system 100 for allocating bandwidth in a network. The system may include a femto base station (fBS) 104 that is operable to communicate wirelessly with one or more endpoints 124 and 128 using a first frequency bandwidth. Femto base station 104 may receive a measurement of a signal quality from one or more of endpoints 124 and 128. Femto base station 104 may communicate an indication of the signal quality to a server 152. Femto base station 104 may receive from server 152 a second frequency bandwidth based on the signal quality and a cost per unit of frequency bandwidth. The second frequency bandwidth may indicate an amount of frequency bandwidth to use in communicating wirelessly with one or more of endpoints 124 and 128. Femto base station 104 may then communicate wirelessly with at least one of endpoints 124 and 128 using the second frequency bandwidth.

In the embodiment depicted in FIG. 1, system 100 includes femto base stations 104, 136, and 140, macro base station (MBS) 144, endpoints 124 and 128, Internet service provider (ISP) network 132, wireless service provider (WSP) network 148, and server 152 coupled as shown. Femto base station 104 may be any suitable device that is operable to communicate wirelessly with one or more endpoints, such as 124 or 128. Although particular types of base stations are shown, other embodiments may include any combination of macro, micro, pico, and/or femto base stations, other types of base stations, and/or relay stations. In particular embodiments, any of these base stations and/or relay stations may be operable to perform some or all of the functions of fBS 104 as described herein.

An fBS (sometimes referred to as a Home node-B in 3GPP terminology or a femtocell in WiMax terminology) may be a miniature base station that a user may install in a home or office to enhance signal strength and service quality to endpoints such as wireless phones or netbooks. When a user is at home, his endpoints may be served by the fBS in his house instead of the MBS outside (and shared by many users), resulting in better quality of service (QoS) for the user and lower resource usage for the WSP.

In some embodiments, fBS 104 may be connected to WSP network 148 through a user's ISP connection from his home through ISP network 132, thus eliminating the need for the WSP to provide backhaul access from fBS 104. The WSP and the ISP may be two different entities with or without special agreement related to fBS 104.

Femto base station 104 may be configured to serve either a closed subscription group (CSG) (e.g., the owner of the base station determines who may access the base station) or any end point with an active service contract to the wireless operator (open subscription group or OSG). Most fBSs are expected to serve CSG instead of OSG.

In some embodiments, a WSP's wireless network may include numerous fBSs that are coupled to the WSP's core network 148. Because the fBSs are purchased and installed by users, the WSP may have little control over the exact locations and/or the densities of these devices. Because each user and/or home location may have its own respective fBS (such as fBS 104), there may be a relatively high concentration of fBSs within a given area (e.g., an apartment complex). In some embodiments, an fBS may use the same licensed spectrum (e.g., the spectrum licensed by the user's WSP) as the local MBS (MBS) 144 and relay stations (not depicted) of the WSP. Thus, in some cases, multiple fBSs may share a common wireless channel due to the limited amount of frequency spectrum available for wireless communication. These factors may increase the chance and/or severity of wireless interference between nearby fBSs and/or other base stations, which in turn may inhibit the performance of an fBS affected by the interference.

One way to reduce the interference between fBSs is to control the frequency bandwidth allocated to each fBS. Frequency bandwidth may refer to an amount of a frequency spectrum that is used for wireless communication. In some embodiments, a frequency bandwidth may be specified by an absolute amount (such as 5 MHz) or a relative amount (such as ⅓ of an available frequency channel). As an example, an fBS may be configured to use a third of the bandwidth of the appropriate wireless channel. If the wireless channel was 6 MHz, the fBS would be configured to use a frequency bandwidth of 2 MHz.

Controlling the frequency bandwidths of fBSs using traditional network planning techniques may not be particularly suitable in a network with a large number of fBSs due to cost and the difficulty of obtaining detailed geometry and propagation information for the fBSs. Moreover, because a user has control over an fBS, the user may turn it on or off at any give time, or may move the fBS to a different location. This may potentially outdate information used to plan the network. Thus, an operator of a network with many fBSs may desire to configure and/or optimize the network in real time.

In some embodiments, a method for dynamically allocating frequency bandwidth in a network may be provided. In certain embodiments, fBS 104 may not communicate with other base stations (such as fBSs 136 or 140) of the WSP's network and may be considered a player in a non-cooperative game trying to maximize its own benefit. In such embodiments, each fBS may balance an increase in data throughput against the cost associated with increasing the amount of frequency bandwidth used. In some embodiments, fBS 104 may adjust the frequency bandwidth that it is using to communicate with one or more endpoints 124 based on, for example, a bandwidth updating algorithm that takes into account the quality of the signal 130 between fBS 104 and endpoint 124, and a cost per unit of frequency bandwidth. In some embodiments, the algorithm may also take into account one or more network tuning constants. Femto base station 104 may update its frequency bandwidth periodically using the bandwidth updating algorithm. In some embodiments, when a plurality of base stations in a network update their respective frequency bandwidths in a similar fashion, the network as a whole may converge to a unique Nash equilibrium of the non-cooperative game (e.g., where every base station will operate at its optimal frequency bandwidth at Pareto optimality). For example, in a network with a plurality of fBSs, a frequency bandwidth set comprising the frequency bandwidth of each fBS may approach and/or converge to a Nash equilibrium. In various embodiments, the bandwidth updating algorithm may be used by fBSs or any other suitable base station.

Various components shown in FIG. 1 (e.g., fBSs 104, 136, 140, MBS 144, server 152, and endpoints 124 and 128) may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of one or more computer systems may comprise any suitable physical form, configuration, number, type and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed; span multiple locations; span multiple machines; or reside in a cloud, which may include one or more cloud components in one or more networks.

Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

In particular embodiments, a computer system may include a processor, memory, storage, and a communication interface. As an example, a base station (such as fBS 104) may comprise a computer system that includes processor 108, memory 112, storage 114, and communication interface 120. These components may work together in order to provide base station functionality, such as increasing the efficiency with which the available wireless resources are used. More specifically, the components of fBS 104 may allow fBS 104 to select and use particular settings for its wireless connection or connections (such as 130 and 134) with one or more endpoints (such as 124 and 128) based on, for example, one or more signal quality measurements from the endpoints.

Processor 108 may be a microprocessor, controller, or any other suitable computing device, resource, or combination of hardware, stored software and/or encoded logic operable to provide, either alone or in conjunction with other fBS 104 components, such as memory 112, fBS 104 functionality. Such functionality may include providing various wireless features discussed herein to an endpoint, base station, and/or relay station. Certain features provided by fBS 104 via, in part, processor 108 may allow system 100 to support more endpoints and/or provide improved quality of service, as compared to a traditional wireless network.

Memory 112 may be any form of volatile or non-volatile memory including, without limitation, magnetic media, optical media, random access memory (RAM), read-only memory (ROM), flash memory, removable media, or any other suitable local or remote memory component or components. Memory 112 may store any suitable data or information utilized by fBS 104, including software embedded in a computer readable medium, and/or encoded logic incorporated in hardware or otherwise stored (e.g., firmware).

In some embodiments, memory 112 may store information used by processor 108 in determining parameters for a wireless connection. Memory 112 may also store the results and/or intermediate results of the various calculations and determinations performed by processor 108. In some embodiments, memory 112 may also store information regarding the wireless connection being used by each endpoint (such as 124 and 128) connected to fBS 104.

Femto base station 104 may also comprise communication interface 120 which may be used for the communication of signaling and/or data between fBS 104 and one or more networks (such as ISP network 132 or WSP network 148). For example, communication interface 120 may perform any formatting or translating that may be needed to allow fBS 104 to send and receive data to and from ISP network 132 over a wired connection. Communication interface 120 may also be used to establish any wired connections between fBS 104 and other networks or network components. In particular embodiments, communication interface 120 may provide a backhaul connection to the WSP's network 148 via the user's internet access supplied by an ISP (which may be the same or a different entity than the WSP).

In some embodiments, components of system 100 (e.g., fBSs 104, 136, and 140, MBS 144, and endpoints 124 and 128) may also comprise a radio and antenna for wireless communication. As an example, fBS 104 comprises a radio 122 that may be coupled to or a part of antenna 126. Radio 122 may receive digital data that is to be sent out to other base stations, relay stations, and/or endpoints via a wireless connection (such as 130). The wireless connection may use the wireless resources assigned to or by fBS 104. The wireless resources may include, for example, a combination of one or more of a center frequency, frequency bandwidth, time slot, channel, and/or sub-channel. In particular embodiments, this information may be stored in memory 112. Radio 122 may convert the digital data into a radio signal having the appropriate center frequency and bandwidth parameters. These parameters may have been determined ahead of time by some combination of processor 108 and memory 112. The radio signal may then be transmitted via antenna 126 for receipt by any appropriate component or device (e.g., endpoint 124). Similarly, radio 122 may convert radio signals received from antenna 126 into digital data to be processed by processor 108.

Antenna 126 may be any type of antenna capable of transmitting and receiving data and/or signals wirelessly. In some embodiments, antenna 126 may comprise one or more omnidirectional, sector or panel antennas operable to transmit/receive radio signals between 2 GHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Radio 122 and antenna 126 may collectively form a wireless interface. This wireless interface may be used to establish connections with various wireless components, including endpoints and relay stations.

Endpoints 124 and 128 may be any type of endpoints operable to wirelessly send and receive data and/or signals to and from fBS 104. Some possible types of endpoints 124 may include desktop computers, PDAs, cell phones, laptops, and/or VoIP phones. In some embodiments, endpoint 124 may comprise a processor, memory, storage, radio, antenna, and/or other components that enable the functionality of endpoint 124. In some embodiments, these components may work together in order to provide endpoint functionality, such as communicating with fBS 104. In some embodiments, the components of endpoint 124 may allow endpoint 124 to detect various factors and determine a signal quality associated with a wireless connection 130 between endpoint 124 and fBS 104. This information may then be communicated to fBS 104 using any of a variety of reporting techniques.

A processor of the endpoint 124 may provide various wireless features discussed herein to endpoint 124. For example, in particular embodiments, a processor may be able to determine a signal quality measurement, such as a signal to interference and noise ratio (SINR). In some embodiments, information relating to signal quality (e.g., signal strength, interference, and noise) may be provided by a wireless interface (e.g., a radio and antenna) of the endpoint.

A memory of the endpoint 124 may store any suitable data or information utilized by the endpoint. In some embodiments, memory may store information used by the endpoint's processor in determining the signal quality. For example, a memory may store parameters, measurements, and/or other information collected by endpoint 124 that relates to the quality of wireless connection 130. A memory may also store the results and/or intermediate results of the various calculations and determinations performed by the endpoint's processor.

Endpoint 124 may also comprise a radio that is coupled to or a part of an antenna to send/receive digital data to/from, for example, fBS 104 via a wireless connection 130. In particular embodiments, information related to the wireless connection 130 (e.g., the wireless resources assigned to endpoint 124) may be stored in a memory of endpoint 124. The radio may convert digital data into a radio signal having the appropriate center frequency and bandwidth parameters. These parameters may have been determined ahead of time and stored in the endpoint's memory. The radio signal may then be transmitted for receipt by any appropriate component or device (e.g., fBS 104). Similarly, the endpoint's radio may convert radio signals received from a device (e.g., fBS 104) into digital data to be processed by the endpoint's processor.

System 100 may comprise a network that includes various networks, such as ISP network 132 and a WSP network 148. In some embodiments, a network may comprise one or more networks, such as the Internet, a LAN, WAN, MAN, PSTN, or some combination of the above. In certain embodiments, ISP network 132 may be coupled to WSP network 148 via one or more networks, including but not limited to, the Internet, a LAN, WAN, MAN, PSTN, or some combination of the above. In some embodiments, an ISP may provide a user with his home network access. A user may use the ISP network 132 for home network access at the user's home location. In providing the user with home network access, the ISP network 132 may include modems, servers, gateways (e.g., an ISP gateway), and/or other suitable components. In some embodiments, the ISP network 132 may provide backhaul access from a base station (such as 104) to a WSP's network 148.

In particular embodiments, WSP network 148 may comprise various servers (such as 152), gateways, switches, routers, and other nodes used in providing wireless service. In some embodiments, the servers may comprise one or more servers, such as Operation, Administration, Maintenance and Provisioning (OAM&P) servers, Network Access Provider (NAP) servers, AAA servers, Self Organizing Network (SON) servers, or any other servers that the WSP may need to configure/authenticate one or more base stations (such as 104) and provide users with wireless service. The WSP's gateways may comprise any hardware and/or software needed to couple WSP network 148 with ISP network 132. For example, in particular embodiments, the gateway may comprise a security gateway and, behind the security gateway, an ASN gateway. In some embodiments, the WSP network 148 may support and/or implement orthogonal frequency-division multiple access (OFDMA).

In various embodiments, WSP network 148 may comprise various types of base stations, such as a macro, micro, pico, femto, or other type of base station. In some embodiments, the bandwidth updating algorithm may be used by any of these base stations. In some embodiments, one or more calculations involved in implementing the bandwidth updating algorithm may be performed by fBS 104, server 152, or other suitable component of the network.

In some embodiments, various base stations (e.g., the MBSs) of the network may be optimized through planning and tuning, rather than through a bandwidth updating algorithm as described herein. In various embodiments, a plurality of base stations of the network may use a common bandwidth updating algorithm, even if they are different types of base stations (e.g., pico and femto).

In the embodiment depicted, system 100 also includes server 152. Server 152 may assist in the management of radio resources used by the base stations of the WSP network 148. In some embodiments, server 152 may be operable to perform any calculations described herein on behalf of one or more femto base stations 104, 136, and 140, MBS 144, another base station, a relay station, or another server. In some embodiments, server 152 may provide one or more frequency bandwidths and/or network tuning constants for one or more base stations and/or relay stations of a network. In particular embodiments, server 152 may be a SON server.

In particular embodiments, server 152 may comprise a computer system that includes processor 156, memory 160, storage 164, and communication interface 172. These components may work together in order to provide server functionality, such as managing the radio resources used by the base stations of the network. More specifically, the components of server 152 may allow server 152 to select particular settings for the wireless connections of femto base stations 104, 136, 140, and/or MBS 144 of the WSP network 148.

Processor 156 may be a microprocessor, controller, or any other suitable computing device, resource, or combination of hardware, stored software and/or encoded logic operable to provide, either alone or in conjunction with other server 152 components, such as memory 160, server 152 functionality. Such functionality may include managing various wireless features discussed herein for a base station or other network component. Certain features provided by server 152 via, in part, processor 156 may allow system 100 to support more base stations and/or provide improved quality of service, as compared to a traditional wireless network. For example, a processor may calculate a frequency bandwidth and/or a network tuning constant.

Memory 160 may be any form of volatile or non-volatile memory including, without limitation, magnetic media, optical media, random access memory (RAM), read-only memory (ROM), flash memory, removable media, or any other suitable local or remote memory component or components. Memory 160 may store any suitable data or information utilized by server 152, including software embedded in a computer readable medium, and/or encoded logic incorporated in hardware or otherwise stored (e.g., firmware).

In some embodiments, memory 160 may store information (e.g., a signal quality measurement) used by processor 156 in determining parameters for a wireless connection, such as a frequency bandwidth or a network tuning constant. Memory 160 may also store the results and/or intermediate results of the various calculations and determinations performed by processor 156.

Server 152 may also comprise communication interface 172 which may be used for the communication of signaling and/or data between server 152 and one or more networks (such as ISP network 132 or WSP network 148) and/or network components, such as fBSs 104, 136, 140, and MBS 144. For example, communication interface 172 may perform any formatting or translating that may be needed to allow server 152 to send and receive data to and from WSP network 148 over a wired connection. Communication interface 172 may also be used to establish any wired connections between server 152 and other networks or network components.

System 100 may also include fBSs 104, 136, 140, and MBS 144 and/or other wireless communication devices that produce interference during wireless communication between fBS 104 and its endpoints 124 and 128. As described above, limited frequency spectrum allocated for wireless communication and a high density of base stations (e.g., fBSs) in a network may intensify this interference, leading to loss of signal quality and quality of service. In some embodiments, network performance may be improved through a bandwidth updating algorithm used by the base stations (such as fBSs 104, 136, and 140, and/or MBS 144) of a network.

In some embodiments, fBS 104 may be a base station "i" of a network comprised of "N" base stations operating in the same frequency channel. In some embodiments, fBS 104 may communicate wirelessly for a period of time with at least one endpoint 124 (and/or 128) using a first frequency bandwidth. For example, fBS 104 may use all or a portion of a frequency channel with a bandwidth of 10 Megahertz (MHz). The normalized bandwidth used by fBS 104 may be represented as $w_i$. For example, fBS 104 with a normalized bandwidth $w_i=0.5$ may wirelessly communicate using a first frequency bandwidth of 5 MHz of the 10 MHz channel.

In some embodiments, the first frequency bandwidth does not have to be contiguous. For example, in an OFDMA scheme, a frequency channel may comprise various frequency subcarriers. In some embodiments, the average transmission power per subcarrier may be fixed. In some embodiments, fBS 104 may randomly (e.g., pseudo-randomly) select frequency subcarriers from the frequency channel. This may allow the interference produced by fBS 104 (and other base stations employing this technique) to be spread across one or more frequency channels used by fBS 104.

In some embodiments, a base station may use a set of frequency subcarriers for a first period of time, a different set of frequency subcarriers for a second period of time, and so on. In some embodiments, the frequency subcarriers may or may not be contiguous. In some embodiments, a base station may use various subcarriers by occupying a subset of physical resource blocks in an LTE communication scheme or a subset of PUSC subchannels in a WiMAX communication scheme.

As fBS 104 communicates wirelessly with at least one endpoint 124 for a period of time, endpoint 124 may measure the signal quality of the wireless communication. For example, the endpoint 124 may perform an SINR calculation for the wireless signal from fBS 104 to the endpoint 124 or other suitable measurement that determines a quality of the wireless signal. The signal quality may generally be impacted by the transmission power and bandwidth usage of the other wireless communication devices of the network (such as fBSs 136 and 140 and MBS 144). Accordingly, the signal quality measurement (e.g., SINR) may incorporate the interference received from surrounding base stations. In some embodiments, the endpoint 124 may communicate the signal quality measurement to fBS 104. In some embodiments, other endpoints (such as 128) that communicate with fBS 104 may communicate a similar measurement. In some embodiments, fBS 104 (or other suitable network component) may assimilate multiple signal quality measurements from its endpoints into one signal quality measurement which can be designated for exemplary purposes as $SINR_i$. Femto base station 104 may use any suitable method for assimilating signal quality measurements, such as averaging.

In some embodiments, the signal quality measurement may be used to determine a data throughput of fBS 104. The data throughput is indicative of the quality of service provided by fBS 104 and may depend in part on the frequency bandwidth and signal quality of fBS 104. The data throughput may be determined in any suitable manner. For example, fBS 104 may track an amount of data transmitted by fBS 104 over a period of time. As another example, in some embodiments, a data throughput ($R_i$) of fBS 104 may be approximated using the Shannon channel capacity. For example:

$$R_i = w_i \ln(1 + \beta \cdot SINR_i)$$

where $0 < \beta < 1$ may represent the gap between the realized modulation and coding scheme (MCS) and the Shannon capacity.

In some embodiments, fBS 104 may calculate its own data throughput $R_i$. In other embodiments, fBS 104 may communicate its frequency bandwidth $w_i$ and $SINR_i$ to another node (such as server 152) for calculation of the data throughput $R_i$.

In some embodiments, the data throughput $R_i$ and frequency bandwidth $w_i$ of fBS 104 over a time interval t may be used to calculate a frequency bandwidth for fBS 104 to use during a next interval t+1 of wireless communication with its one or more endpoints. In some embodiments, fBS 104 may try to maximize a net utility function $NU_i$ based on the data throughput $R_i$ of fBS 104 and a cost per unit of frequency bandwidth $c_i$ used by fBS 104. For example, the net utility of fBS 104 may be represented as:

$$NU_i(w_i, R_i) = U_i(R_i(w_i)) - c_i w_i$$

where $U_i(R_i(w_i))$ is the utility of the data throughput $R_i$ of fBS 104 when it uses frequency bandwidth $w_i$. Thus, the net utility may be based on the data throughput $R_i$ at a given frequency bandwidth $w_i$ and the cost $c_i$ of using the frequency bandwidth $w_i$. In some embodiments, the cost $c_i$ cost may influence the net utility that fBS 104 provides when the fBS uses frequency bandwidth $w_i$ to communicate with its endpoints. In some embodiments, the cost $c_i$ is a value configured to discourage excessive use of frequency bandwidth by fBS 104. As an example, if there was no cost $c_i$ associated with frequency bandwidth usage, each fBS might try to maximize its own utility by using all of its available frequency bandwidth. This would likely result in suboptimal system performance due to the excessive interference that would be generated by the fBSs of the network. In some embodiments, the cost term $c_i$ may be determined and/or supplied by server 152, which in some embodiments may be a SON server.

In some embodiments, the only interaction between base stations (such as fBSs) in a network may be the interference they cause each other. In some embodiments, an fBS 104 may adjust its frequency bandwidth $w_i$ to maximize its own net utility. Checking the first order optimality condition by taking the derivative of the net utility equation with respect to $w_i$ (and keeping in mind the constraint $0 \leq w_i \leq 1$) yields the following result, hereafter referred to as "Result A":

$$w_i^* = \min\left(\frac{1}{\ln(1 + \beta \cdot SINR_i(W^*))} f^{-1}\left(\frac{c_i}{\ln(1 + \beta \cdot SINR_i(W^*))}\right), 1\right)$$

where $f_i(x) = \frac{dU_i(x)}{dx} = U_i'(x)$, and $W = [w_0, \ldots, w_{N-1}]^T$ Since $SINR_i$ is a function of W, this equation for optimal frequency bandwidth $w_i^*$ does not provide a direct solution to the optimum value of $w_i$. However, it provides the basis for an iterative algorithm of updating $w_i$. In some embodiments, the utility function $U_i$ may be chosen such that it is an increasing and concave function of data throughput $R_i$ of a base station. In particular embodiments, the utility function $U_i$ may be chosen so that iterative updates allow the network to converge to a unique Nash equilibrium W*.

In general, a Nash equilibrium may be a solution set of a game involving two or more players, in which each player is assumed to know the equilibrium strategies of the other players, and in which no player has anything to gain by changing only his or her own strategy unilaterally. In particular embodiments, the process that each base station uses to update its bandwidth usage, based on the bandwidth usage of the other base stations in the network, may be viewed as a non-cooperative game where each player (base station) tries to maximize its own benefit (net utility $NU_i$) by adjusting its strategy $w_i$. Thus, a Nash equilibrium may be the set $W^* = [w_0^*, \ldots, w_{N-1}^*]^T$, where W* satisfies:

$$NU_i(w_i^*, W_{-i}^*) \geq NU_i(w_i', W_{-i}^*)$$

for all $0 \leq w_i' \leq 1$, $0 \leq i \leq N-1$.

At W*, each base station has maximized its own net utility $NU_i$ as long as the frequency bandwidth usage by each base station of the network remains constant. Thus, in some embodiments, iterative updates of the frequency bandwidths used by the base stations of a network may allow the network to approach and/or converge to a Nash equilibrium and achieve Pareto optimality. That is, a set that comprises a frequency bandwidth for each base station of the network may approach and eventually converge to a Nash equilibrium.

In some embodiments, the choice of the utility function $U_i$ may allow the network to converge to a Nash equilibrium as the base stations periodically update their respective frequency bandwidths. In general, an iterative algorithm may converge to a unique fixed point if it is a standard function, that is, the algorithm satisfies the conditions of positivity, monotonicity, and scalability. In some embodiments, the utility function may be chosen such that the bandwidth updating algorithm is a standard function, thus allowing convergence. For example, a utility function of the form $$U_i(x) = -\alpha_i x^{-k_i}, \alpha_i > 0, k_i > 0$$

may allow the network to converge to a Nash equilibrium. Utilizing this equation in conjunction with the equation for optimal frequency bandwidth $w_i^*$ listed above (e.g., plugging this equation into Result A) yields an exemplary bandwidth updating algorithm of:

$$w_i^{t+1} = w_i^* = \min\left(\gamma_i \left(\frac{R_i^t}{w_i^t}\right)^{-l_i}, 1\right)$$

where t is the number of the update interval, $$\gamma_i = \left(\frac{\alpha_i k_i}{c_i}\right)^{\left(\frac{1}{k_i+1}\right)}, \text{ and } l_i = \frac{k_i}{k_i+1}.$$

In some embodiments, $\alpha_i$ may equal one. In other embodiments, $\alpha_i$ may be a hysteresis parameter that varies with each update.

In some embodiments, $l_i$ and $\gamma_i$ are network tuning constants that can be tuned to adjust the Nash equilibrium of the system 100. In some embodiments, the tuning constants may be designed to effectuate a policy scheme of the system, such as network-wide data throughput, fairness, or other policy consideration. In some embodiments, the network tuning constants may be adjusted based on the network load. These network tuning constants may be supplied and/or calculated in any suitable manner. For example, a base station may be pre-configured (e.g., during manufacturing or before deployment in a network) to use one or more particular network tuning constants. As another example, one or more of these network tuning constants may be supplied by a server, such as server 152. In some embodiments, one or more network tuning constants may be supplied periodically, upon start up of fBS 104, in response to a triggering event (e.g., when a new fBS joins wireless network 148), and/or at any other suitable time. The network tuning constants may be updated by any suitable entity, such as server 152. In some embodiments, an update to a network tuning constant may be based on the frequency bandwidth $w_i$ and/or data throughput $R_i$ of a base station over an interval of time t. In various embodiments, a base station of a network may be assigned network tuning constants that are tailored for that particular base station. Thus, in some embodiments, different network tuning constants may be used for different base stations.

In some embodiments, a frequency bandwidth for fBS 104 to use during a future time interval t+1 may be calculated using the bandwidth updating algorithm described above. The calculated frequency bandwidth may be based on the data throughput $R_i$ and bandwidth $w_i$ of a previous time interval t, and the network tuning constants $l_i$ and $\gamma_i$. In some embodiments, a table of $x^{-l_i}$ may be pre-computed and stored in memory (e.g., 112 or 160) or storage (e.g., 114 or 164) in order to aid computation of $$\left(\frac{R_i}{w_i}\right)^{-l_i}$$

by reducing the operation to a table lookup. This may be particularly helpful when the frequency bandwidth is calculated by a base station (such as fBS 104), or when server 152 must quickly calculate frequency bandwidths for numerous base stations of a network.

After a frequency bandwidth $w_i$ for the next time interval t+1 has been calculated, the new frequency bandwidth may be used to communicate wirelessly with at least one of endpoints 124 or 128. As with the first frequency bandwidth, the new frequency bandwidth may comprise a plurality of frequency subcarriers that are randomly selected. After a time interval has passed, the frequency bandwidth may be updated again according to the bandwidth updating algorithm. This process may repeat any number of times.

In some embodiments, fBS 104 may periodically update its frequency bandwidth usage $w_i$ in order to maximize its own net utility. In particular embodiments, the length of the update interval may be long enough for a determination of the data throughput $R_i$ of fBS 104, while short enough to accommodate changes in the network, such as a change of load or number of endpoints communicating with a base station of the network, the powering up or down of a base station, changes in channel gain of a base station, or changes in noise. In various embodiments, the base stations of a network may update their respective frequency bandwidths synchronously or asynchronously with respect to the other base stations.

FIG. 2 depicts various architectures that may be used for allocating bandwidth in a network. Some embodiments may include a distributed architecture utilizing architecture 200. In a distributed architecture, the nodes 208, 212, and 216 of the network may be responsible for calculating their respective frequency bandwidths. In some embodiments, a node may use any suitable information to calculate a frequency bandwidth, such as its frequency bandwidth and data throughput over a time interval and one or more network tuning constants. In some embodiments, the network tuning constants may be supplied by server 204. After calculating a new frequency bandwidth, the node 208 may use the new frequency bandwidth to communicate with its endpoints. The distributed architecture is highly scalable, since each added node is expected to calculate its own frequency bandwidths, thus reducing the load on server 152.

Some embodiments may include a centralized architecture utilizing architecture 200. In a centralized architecture, server 204 may calculate frequency bandwidths for the nodes 208, 212, and 216 of the network. For example, the server 204 may determine a frequency bandwidth set comprising a frequency bandwidth for each of the nodes 208, 212, and 216. In some embodiments, nodes 208, 212, and 216 may report one or more parameters to server 204. For example, node 208 may report its frequency bandwidth $w_i$ and data throughput $R_i$ over a time interval to server 204. The server may use these parameters to calculate a new frequency bandwidth $w_i$ for node 208.

In some embodiments, server 204 may also use one or more network tuning constants to calculate the frequency bandwidths. In some embodiments, the one or more network tuning constants may be based on the parameters received from one or more of nodes 208, 212, and 216. For example, since server 204 may receive data from various nodes 208, 212, and 216, it may determine that a particular node 208 should have a higher frequency bandwidth and may update one or more network tuning constants accordingly.

In particular embodiments, the Nash equilibrium of the network may be tuned to provide a system preference, such as network-wide data throughput, fairness, or other policy considerations. As the network tuning constants are updated and new frequency bandwidths are calculated, the wireless network may converge on the tuned preferences. In some embodiments, the process of updating the network tuning constants may be transparent to the nodes since they receive the updated frequency bandwidth (which incorporates the network tuning constants).

In some embodiments, server 204 may communicate a newly calculated frequency bandwidth to node 208. Node 208 may then use the new frequency bandwidth to communicate with one or more of its endpoints.

Some embodiments may include a hybrid architecture utilizing architecture 200. In a hybrid architecture, nodes 208, 212, and 216 of the network may be responsible for calculating their respective frequency bandwidths and may report one or more parameters to server 204. For example, a node may report its frequency bandwidth $w_i$ and data throughput $R_i$ over a time interval to server 204. In some embodiments, these parameters may be transferred from node 208 to server 204 using a standard network management interface. The server may use these parameters to calculate one or more network tuning constants (such as $l_i$, $\gamma_i$) in any suitable manner, such as that described above with respect to the centralized architecture. The server may then communicate these tuning constants to node 208. Node 208 may then calculate a new frequency bandwidth $w_i$ based on these tuning constants (and a measured data throughput and frequency bandwidth of the node). Node 208 may then use the new frequency bandwidth to communicate with its endpoints.

In comparison with the centralized architecture (where the server may perform the bulk of the calculations), the hybrid approach is more scalable since the individual nodes calculate their respective frequency bandwidths. In the centralized architecture the nodes of the network are not required to implement the bandwidth updating algorithm (and thus nodes that do not have this capability would still be able to update their frequency bandwidth based on values calculated by the server). In both the centralized and hybrid architectures, nodes 208, 212, and 216, and server 204 exchange a minimal amount of data, thus maintaining a low communication overhead.

Some embodiments may include a hierarchical architecture utilizing architecture 250. A hierarchical architecture may comprise various subnets. Each subnet may comprise one of subnet servers 258 or 274 and a plurality of nodes coupled to the subnet server. In some embodiments, each subnet server may be coupled to a central server 254. In some embodiments, a hierarchical architecture may include any number of subnets.

In some embodiments, a subnet may employ a centralized or hybrid architecture as described above. In some embodiments, a subnet server may communicate information received from one or more of its respective nodes to central server 254. For example, subnet server 258 may communicate a frequency bandwidth $w_i$ or a data throughput $R_i$ of a node 262 to central server 254. In some embodiments, a subnet server may determine one or more network tuning constants for its nodes and communicate these tuning constants to central server 254. In some embodiments, central server 254 may calculate any suitable parameter (such as a frequency bandwidth or a network tuning constant) for any node in its network.

In some embodiments, central server 254 may coordinate the entire network. For example, the central server may manage the radio resources used in the network. In other embodiments, the network-wide coordination may be performed in a distributed manner among the subnet servers.

In some embodiments, any combination of the distributed, hybrid, centralized, and/or hierarchical architectures may be used. For example, a subset of base stations in a network may calculate their own frequency bandwidths, while another subset passes information to a server for the calculation of frequency bandwidths.

FIG. 3 depicts an example of a method for allocating bandwidth in a wireless network. For purposes of simplicity, the steps of FIG. 3 are described from the perspective of a base station. The method begins at step 300. At step 304, a base station may communicate wirelessly with one or more endpoints using a first frequency bandwidth. In some embodiments, the first frequency bandwidth may comprise a plurality of subcarriers spread throughout the frequency channel used by the base station. In some embodiments, the plurality of subcarriers may be selected at random from the available subcarriers of the frequency channel.

At step 308, the base station may receive one or more signal quality measurements from its endpoints. The signal quality measurements may indicate a quality of the wireless communication between the base station and the endpoint that reports the signal quality measurement. The signal quality may include information about the strength of the wireless signal from the base station to the endpoint and information about the interference received from other base stations and/or other network components in the network.

At step 312, a second frequency bandwidth determined using a bandwidth updating algorithm may be received from a server or other suitable network component. In some embodiments, prior to reception of the second frequency bandwidth, the base station may send an indication of the signal quality between the base station and its one or more endpoints to the server or other suitable network component. In some embodiments, the bandwidth updating algorithm may be implemented by the server or other network component and may be based on an indication of the signal quality between the base station and its one or more endpoints. For example, the bandwidth updating algorithm implemented by the server or other network component may use the signal quality measurements received from the endpoints of the base station. As another example, the bandwidth updating algorithm may use a calculation that is based on the signal quality measurements, such as a data throughput or other suitable calculation. The bandwidth updating algorithm may also be based on a cost per unit of frequency bandwidth and one or more network tuning constants. In some embodiments, the network tuning constants and/or cost per unit of frequency bandwidth may be supplied by a server that manages a plurality of base stations. In some embodiments, at least a portion of the bandwidth updating algorithm may be implemented by the base station.

At step 316, the base station communicates wirelessly with its endpoints using the second frequency bandwidth. At step 320, a single iteration of the method is complete. Depending on the scenario, one or more steps of the method may then be repeated (the steps may be repeated periodically or upon detecting a triggering event, such as detecting a new endpoint). For example, after step 320, the method may begin again at step 300.

The embodiments that this disclosure (including all attachments hereto) describes or illustrates are examples, and they do not limit the scope of this disclosure. This disclosure encompasses all changes, substitutions, variations, alterations, and modifications to the example embodiments herein that a person having ordinary skill in the art would comprehend.

Modifications, additions, or omissions may be made to the systems and apparatuses disclosed herein without departing from the scope of this disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising tangibly stored software, hardware, and/or other encoded logic. As used in this document, "each" refers to each member of a set or each member of a subset of a set.

Modifications, additions, or omissions may be made to the methods disclosed herein without departing from the scope of this disclosure. The method may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
   communicating wirelessly with at least one endpoint via a first frequency bandwidth;
   receiving a measurement of a signal quality from the at least one endpoint;
   communicating an indication of the signal quality to a server of a plurality of nodes;
   receiving from the server a second frequency bandwidth based on the signal quality, one or more network tuning constants, and a cost per unit of frequency bandwidth, the second frequency bandwidth indicating an amount of frequency bandwidth to use in communicating wirelessly with the at least one endpoint; and
   communicating wirelessly with the at least one endpoint via the second frequency bandwidth,
   wherein communicating an indication of the signal quality to a server comprises communicating the indication of the signal quality to a subnet server coupled to a central server, the central server operable to coordinate a plurality of subnets, each subnet comprising a subnet server operable to communicate to each node of a plurality of nodes a frequency bandwidth based on a signal quality and a cost per unit of frequency bandwidth of the respective node.

2. The method of claim 1, wherein receiving from the server a second frequency bandwidth comprises:
   receiving from the server a second frequency bandwidth that is a member of a frequency bandwidth set comprising a plurality of frequency bandwidths, each frequency bandwidth calculated by the server for a different respective node of the plurality of nodes, the frequency bandwidth set approaching a Nash equilibrium.

3. The method of claim 1, wherein the one or more network tuning constants are supplied by the server or a central server that coordinates a plurality of subnet servers of a network.

4. The method of claim 1, further comprising:
   randomly selecting a plurality of frequency subcarriers for the second frequency bandwidth.

5. An apparatus comprising:
   an interface configured to:
      communicate wirelessly with at least one endpoint via a first frequency bandwidth;
      receive a measurement of a signal quality from the at least one endpoint;
      communicate an indication of the signal quality to a server of a plurality of nodes;
      receive from the server a second frequency bandwidth based on the signal quality, one or more network tuning constants, and a cost per unit of frequency bandwidth, the second frequency bandwidth indicating an amount of frequency bandwidth to use in communicating wirelessly with the at least one endpoint; and
      communicate wirelessly with the at least one endpoint via the second frequency bandwidth,
      wherein the interface configured to communicate an indication of the signal quality is further configured to:
         communicate the indication of the signal quality to a subnet server coupled to a central server, the central server operable to coordinate a plurality of subnets, each subnet comprising a subnet server operable to communicate to each node of a plurality of nodes a frequency bandwidth based on a signal quality and a cost per unit of frequency bandwidth of the respective node.

6. The apparatus of claim 5, wherein the interface configured to receive from the server a second frequency bandwidth is further configured to:
   receive from the server a second frequency bandwidth that is a member of a frequency bandwidth set comprising a plurality of frequency bandwidths, each frequency bandwidth calculated by the server for a different respective node of the plurality of nodes, the frequency bandwidth set approaching a Nash equilibrium.

7. The apparatus of claim 5, wherein the one or more network tuning are supplied by the server or a central server that coordinates a plurality of subnet servers of a network.

8. The apparatus of claim 5, further comprising a processor coupled to the interface and configured to:
   randomly select a plurality of frequency subcarriers for the second frequency bandwidth.

9. Logic embodied in non-transitory computer-readable storage media that when executed by a processor is configured to:
   communicate wirelessly with at least one endpoint via a first frequency bandwidth;
   receive a measurement of a signal quality from the at least one endpoint;
communicate an indication of the signal quality to a server of a plurality of nodes;

receive from the server a second frequency bandwidth based on the signal quality, one or more network tuning constants, and a cost per unit of frequency bandwidth, the second frequency bandwidth indicating an amount of frequency bandwidth to use in communicating wirelessly with the at least one endpoint; and communicate wirelessly with the at least one endpoint via the second frequency bandwidth, wherein communicating an indication of the signal quality to a server comprises communicating the indication of the signal quality to a subnet server coupled to a central server, the central server operable to coordinate a plurality of subnets, each subnet comprising a subnet server operable to communicate to each node of a plurality of nodes a frequency bandwidth based on a signal quality and a cost per unit of frequency bandwidth of the respective node.

10. A method, comprising:

receiving an indication of a signal quality of at least one wireless communication between at least one node and at least one endpoint, the at least one wireless communication via a first frequency bandwidth;

determining a second frequency bandwidth based on the indication of the signal quality, one or more network tuning constants, and a cost per unit of frequency bandwidth, the second frequency bandwidth indicating an amount of frequency bandwidth for the at least one node to use in communicating wirelessly with the at least one endpoint; and communicating an indication of the second frequency bandwidth to the at least one node for use during wireless communication with the at least one endpoint, further comprising:

sending one or more indications of one or more signal qualities to a central server coupled to a plurality of subnet servers; and receiving the one or more network tuning constants from the central server, at least one of the network tuning constants based on at least one of the one or more signal qualities.

11. The method of claim 10, further comprising:

determining a frequency bandwidth set comprising a frequency bandwidth for each node of a plurality of nodes, wherein the frequency bandwidth set approaches a Nash equilibrium.

12. The method of claim 10, further comprising:

receiving at least one additional indication of at least one additional signal quality of at least one wireless communication between at least one additional node and at least one additional endpoint, the at least one additional wireless communication via an additional frequency bandwidth; and determining the one or more network tuning constants based on the indication of the signal quality and the at least one additional indication of the at least one additional signal quality.

13. An apparatus comprising:

an interface configured to receive an indication of a signal quality of at least one wireless communication between at least one node and at least one endpoint, the at least one wireless communication via a first frequency bandwidth; and a processor coupled to the interface and configured to determine a second frequency bandwidth based on the indication of the signal quality, one or more network tuning constants, and a cost per unit of frequency bandwidth, the second frequency bandwidth indicating an amount of frequency bandwidth for the at least one node to use in communicating wirelessly with the at least one endpoint; and wherein the interface is further configured to communicate an indication of the second frequency bandwidth to the at least one node for use during wireless communication with the at least one endpoint, wherein communicating an indication of the signal quality to a server comprises communicating the indication of the signal quality to a subnet server coupled to a central server, the central server operable to coordinate a plurality of subnets, each subnet comprising a subnet server operable to communicate to each node of a plurality of nodes a frequency bandwidth based on a signal quality and a cost per unit of frequency bandwidth of the respective node.

14. The apparatus of claim 13, wherein the processor is further configured to:

determine a frequency bandwidth set comprising a frequency bandwidth for each node of a plurality of nodes, wherein the frequency bandwidth set approaches a Nash equilibrium.

15. Logic embodied in non-transitory computer-readable storage media that when executed by a processor is operable to:

receive an indication of a signal quality of at least one wireless communication between at least one node and at least one endpoint, the at least one wireless communication via a first frequency bandwidth;

determine a second frequency bandwidth based on the indication of the signal quality, one or more network tuning constants, and a cost per unit of frequency bandwidth, the second frequency bandwidth indicating an amount of frequency bandwidth for the at least one node to use in communicating wirelessly with the at least one endpoint; and communicate an indication of the second frequency bandwidth to the at least one node for use during wireless communication with the at least one endpoint, wherein communicating an indication of the signal quality to a server comprises communicating the indication of the signal quality to a subnet server coupled to a central server, the central server operable to coordinate a plurality of subnets, each subnet comprising a subnet server operable to communicate to each node of a plurality of nodes a frequency bandwidth based on a signal quality and a cost per unit of frequency bandwidth of the respective node.

* * * * *